United States Patent
Jayasena et al.

(10) Patent No.: US 11,055,150 B2
(45) Date of Patent: Jul. 6, 2021

(54) FAST THREAD WAKE-UP THROUGH EARLY LOCK RELEASE

(71) Applicant: Advanced Micro Devices, Inc., Santa Clara, CA (US)

(72) Inventors: Nuwan Jayasena, Cupertino, CA (US); Amin Farmahini-Farahani, Santa Clara, CA (US); David A. Roberts, Wellesley, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 7 days.

(21) Appl. No.: 15/952,143

(22) Filed: Apr. 12, 2018

(65) Prior Publication Data

US 2019/0317832 A1  Oct. 17, 2019

(51) Int. Cl.
  *G06F 9/52*  (2006.01)
  *G06F 9/48*  (2006.01)
  *G06F 9/50*  (2006.01)

(52) U.S. Cl.
  CPC .......... *G06F 9/52* (2013.01); *G06F 9/48* (2013.01); *G06F 9/485* (2013.01); *G06F 9/4806* (2013.01); *G06F 9/4843* (2013.01); *G06F 9/50* (2013.01); *G06F 9/5005* (2013.01); *G06F 9/5011* (2013.01); *G06F 9/522* (2013.01); *G06F 9/526* (2013.01); *G06F 9/528* (2013.01)

(58) Field of Classification Search
  CPC . G06F 9/46; G06F 9/48; G06F 9/4806; G06F 9/4843; G06F 9/485; G06F 9/50; G06F 9/5005; G06F 9/5011; G06F 9/5022; G06F 9/52; G06F 9/522; G06F 9/526; G06F 9/528
  See application file for complete search history.

(56) References Cited

U.S. PATENT DOCUMENTS

| | | | |
|---|---|---|---|
| 8,752,057 B1* | 6/2014 | Gould | G06F 9/526 718/102 |
| 2007/0101071 A1* | 5/2007 | McKenney | G06F 9/526 711/152 |
| 2010/0275209 A1* | 10/2010 | Detlefs | G06F 9/526 718/102 |
| 2015/0317182 A1* | 11/2015 | Serebrin | G06F 9/467 711/119 |
| 2016/0077889 A1* | 3/2016 | Falco | G06F 9/542 718/106 |
| 2016/0092280 A1* | 3/2016 | Ai | G06F 9/52 718/106 |
| 2017/0039094 A1* | 2/2017 | Dice | G06F 9/526 |
| 2018/0373573 A1* | 12/2018 | Sherlock | G06F 9/524 |

* cited by examiner

*Primary Examiner* — Charles M Swift
(74) *Attorney, Agent, or Firm* — Volpe Koenig (57) ABSTRACT

A thread holding a lock notifies a sleeping thread that is waiting on the lock that the lock holding thread is "about" to release the lock. In response to the notification, the waiting thread is woken up. While the waiting thread is woken up, the lock holding thread completes other operations prior to actually releasing the lock and then releases the lock. The notification to the waiting thread hides latency associated with waking up the waiting thread by allowing operations that wake up the waiting thread to occur while the lock holding thread is performing the other operations prior to releasing the thread.

20 Claims, 6 Drawing Sheets

FAST THREAD WAKE-UP THROUGH EARLY LOCK RELEASE

BACKGROUND

Because threads represent different sequences of execution, the threads cannot rely on execution flow order to manage data dependencies. Instead, threads must use inter-thread synchronization mechanisms. One such mechanism is a lock. A locking thread acquires a lock by performing a particular instruction such as an atomic operation that reads and then conditionally writes to a lock variable, where "atomic" means that the operation is guaranteed to execute without interference from another thread. The fact that a thread has acquired a lock is visible to other threads participating in the synchronization. Those other threads wait for the lock-owning thread to release the lock before proceeding with their own subsequent operations that require holding the lock. Improvements in thread synchronization mechanisms, such as synchronization locks, are constantly being made.

BRIEF DESCRIPTION OF THE DRAWINGS

A more detailed understanding can be had from the following description, given by way of example in conjunction with the accompanying drawings wherein.

DETAILED DESCRIPTION

Techniques are provided herein whereby a thread holding a lock notifies a sleeping thread that is waiting on the lock that the lock holding thread is "about" to release the lock. In response to the notification, the waiting thread is woken up. While the waiting thread is woken up, the lock holding thread completes other operations prior to actually releasing the lock and then releases the lock. The notification to the waiting thread hides latency associated with waking up the waiting thread by allowing operations that wake up the waiting thread to occur while the lock holding thread is performing the other operations prior to releasing the thread.

Figure 1:
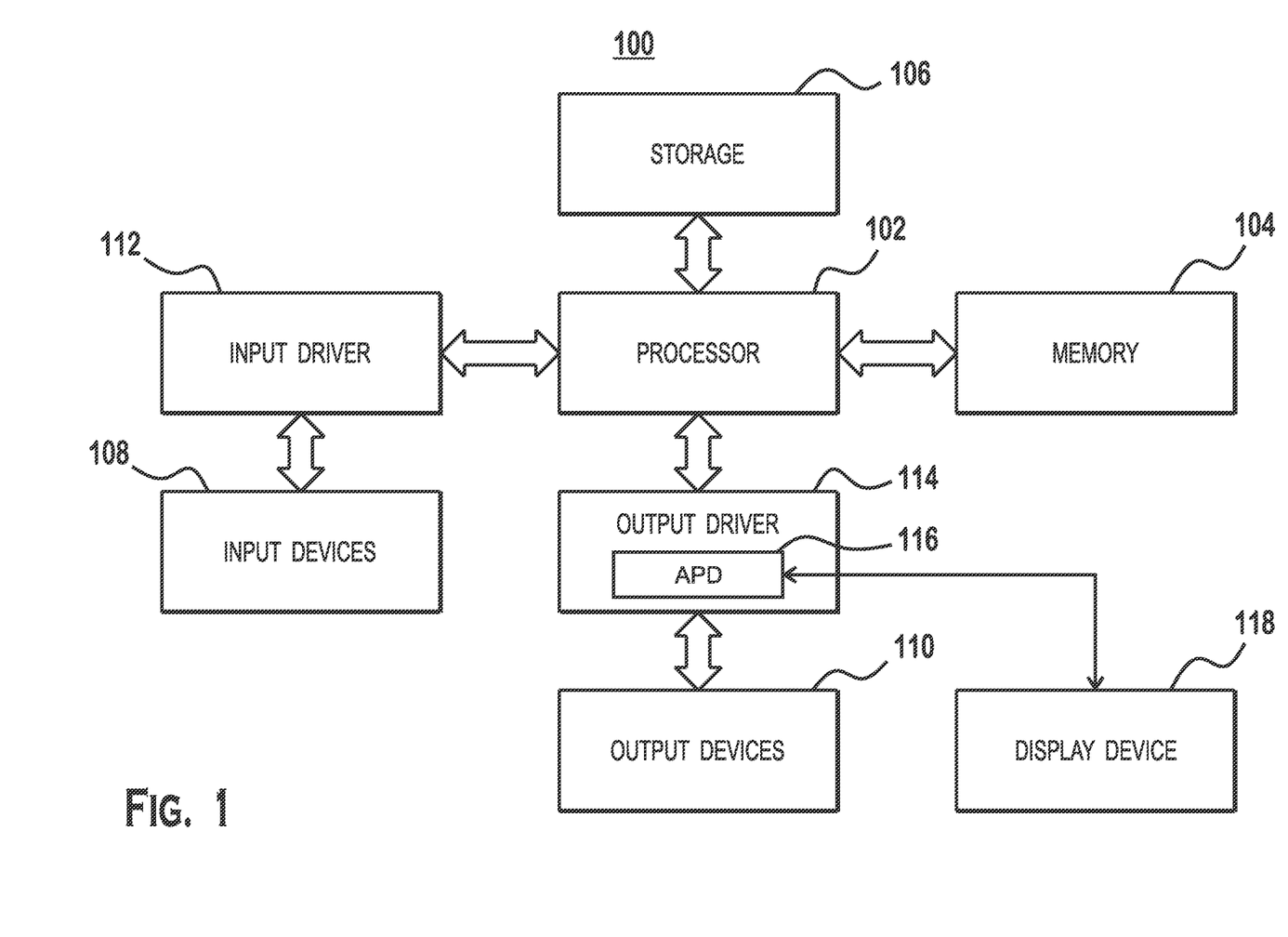
FIG. 1 is a block diagram of an example device in which one or more features of the disclosure can be implemented.

FIG. 1 is a block diagram of an example device 100 that is capable of implementing one or more features of the disclosure, according to an example. In various examples, the device 100 is embodied as, or is at least a portion of, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 also optionally includes an input driver 112 and an output driver 114. In various examples, the device 100 also includes additional components not shown in FIG. 1.

In various alternatives, the processor 102 includes or is embodied as a central processing unit (CPU), a graphics processing unit (GPU), a CPU and GPU located on the same die, or one or more processor cores, wherein each processor core is a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device ("APD") 116 which is coupled to a display device 118. The APD is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. In various implementations, these parallel processing units perform at least some of the operations described herein (such as executing threads and performing thread synchronization operations described herein).

Figure 2A:
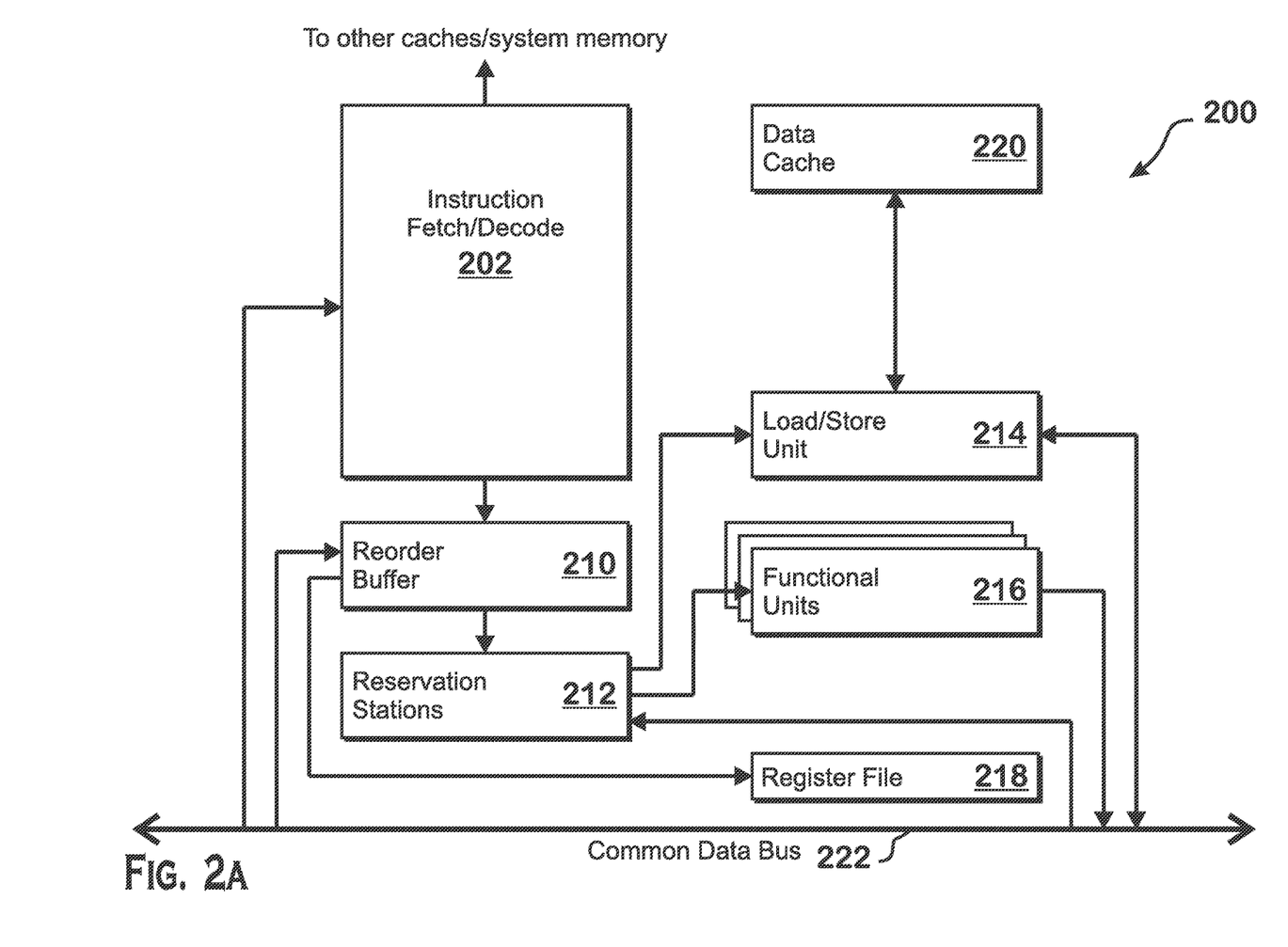
FIG. 2A is a block diagram of an instruction execution pipeline of the processor of FIG. 1, according to an example.

FIG. 2A is a block diagram of an instruction execution pipeline 200, included within the processor 102 of FIG. 1, according to an example. The instruction execution pipeline 200 retrieves instructions from memory and executes the instructions, outputting data to memory and modifying the state of elements within the instruction execution pipeline 200, such as registers within register file 218.

The instruction execution pipeline 200 includes an instruction fetch and decode unit 202 that fetches instructions from system memory (such as memory 104) via an instruction cache 202 and decodes the fetched instructions. Decoding the fetched instructions converts the fetched instructions to micro-operations (also just "operations") for execution by the instruction execution pipeline 200. The term "instructions" refers to tasks that are specified in an instruction set architecture for the processor 102. Instructions can be specified for execution by software. Micro-operations are sub-tasks that are not generally directly usable by software. Instead, micro-operations are the individual tasks actually carried out by the processor 102 in order to perform the instructions requested by software. Decoding instructions thus includes identifying control signals to be applied to functional units 216, a load/store unit 214, and other portions of the instruction execution pipeline 200.

The execution pipeline 200 also includes functional units 216 that perform calculations to process the micro-operations, a load/store unit 214 that loads data from or stores data to system memory via a data cache 220 as specified by the micro-operations, and a register file 218 that includes registers that store working data for the micro-operations.

A reorder buffer 210 tracks instructions that are currently in-flight and ensures in-order retirement of instructions despite allowing out-of-order execution while in-flight. "In-flight" instructions refers to instructions that have been received by the reorder buffer 210 but have not yet "retired"—that is, have not yet had results committed to the architectural state of the processor (e.g., results written to architectural registers). When all micro-operations of an instruction have been performed, the instruction is considered to be retired. Reservation stations 212 maintain in-flight micro-operations and track operands for micro-operations. When all operands are ready for execution of a particular micro-operation, reservation stations 212 send the micro-operation to a functional unit 216 or a load/store unit 214 for execution.

Various elements of the instruction execution pipeline 200 communicate via a common data bus 222. For example, the functional units 216 and load/store unit 214 write results to the common data bus 222 which may be read by reservation stations 212 for execution of dependent instructions/micro-operations and by the reorder buffer 210 as the final processing result of an in-flight instruction that has finished execution. The load/store unit 214 also reads data from the common data bus 222. For example, the load/store unit 214 reads results from completed instructions from the common data bus 222 and writes the results to memory via the data cache 220 for store instructions.

Figure 2B:
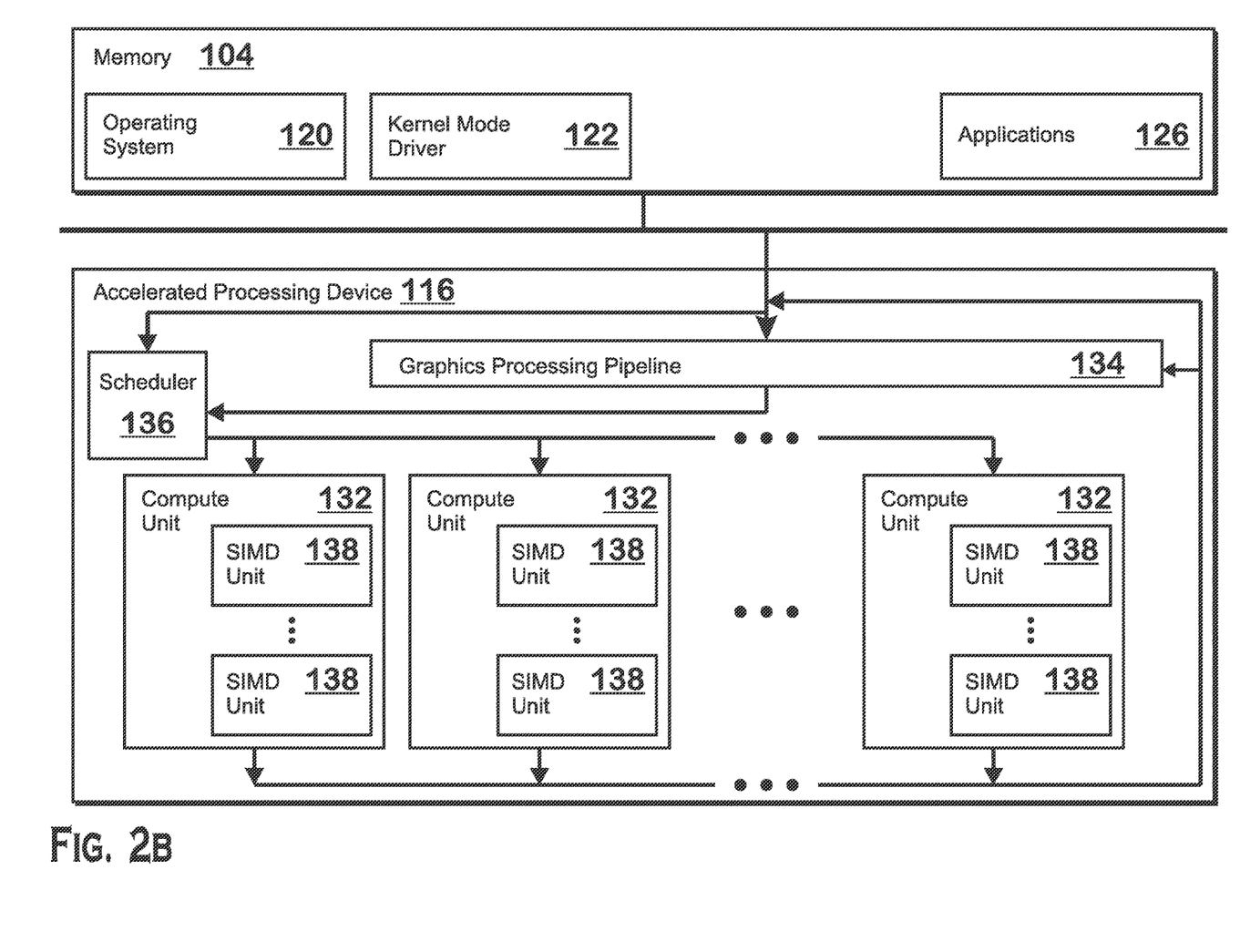
FIG. 2B is a block diagram of the accelerated processing device of FIG. 1, according to an example.

FIG. 2B is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Various processors of the device 100, such as the processor 102, the APD 116, or other processors within the device 100, are capable of execution in a multithreaded manner. Multithreaded execution is a form of parallel execution in which different execution threads (e.g., processes, applications, or portions thereof) execute during the same time period. Some software relies on thread synchronization to operate correctly. Because threads represent different sequences of execution, the threads cannot rely on execution flow order to manage data dependencies. Instead, threads must use inter-thread communication or synchronization mechanisms. One such mechanism is a lock. A locking thread acquires a lock by performing a particular instruction or set of instructions such as an atomic operation that reads then conditionally writes to a lock variable, where "atomic" means that the operation is guaranteed to execute without interference from another thread. The fact that a thread has acquired a lock is visible to other threads participating in the synchronization. Once the locking thread has acquired the lock, other threads "know" that the lock-owning thread is performing an operation related to shared data. Those other threads thus wait for the lock-owning thread to release the lock before proceeding with operations dependent on the operations performed by the lock-owning thread.

In some instances, threads waiting on a lock to be released before proceeding are put to sleep while waiting for that lock to be released. Although the exact mechanism for putting a thread to sleep varies based on architecture, operating system, and other factors, a sleeping thread is generally deactivated in such a way that requires the thread to be "woken up" in order to resume execution. In various examples, thread wake-up consumes a large amount of time. In some examples, thread wake-up consumes several microseconds, which is the equivalent of several thousand cycles.

Figure 3:
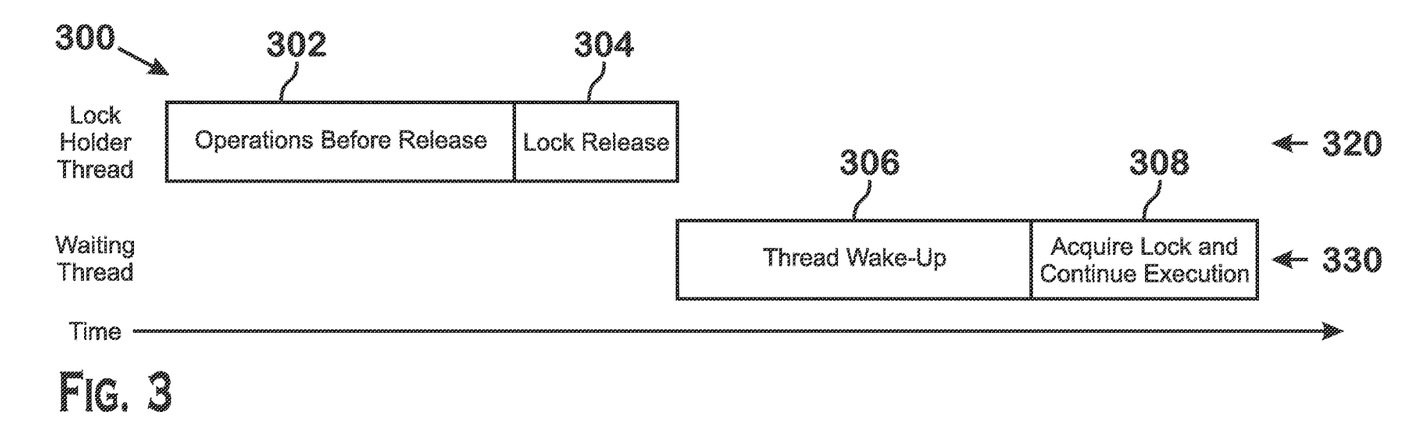
FIG. 3 presents a graph illustrating thread lock and wake-up operations, according to an example.

FIG. 3 presents a graph 300 illustrating thread lock and wake-up operations, according to an example. A lock holder thread graph 320 illustrates operations of a lock holder thread and a waiting thread graph 330 illustrates operations of a thread waiting for the lock to be released (a "waiting thread"). The operations are illustrated as boxes. Time is shown as progressing from left to right. Thus operations on the left side occur earlier than operations on the right side. Further, it should be understood that operations for one thread that "overlap" in horizontal space with operations in another thread occur within overlapping time periods, although the specific relative timings illustrated in FIG. 3 (as well as FIG. 4, described below) should be understood as illustrating an example and should not read to be limiting.

The earliest moment of time illustrated in FIG. 3 is while the lock holder thread is already holding the lock. The lock holder thread performs some operations before lock release 302, which are simply operations of the lock holder thread before that thread is ready to release the lock according to the software being executed by the lock holder thread. After finishing the operations before lock release 302, the lock holder thread performs the lock release operation 304, which releases the lock and allows the waiting thread to proceed.

Once the lock is released, the waiting thread is informed of the release. An entity such as an operating system, a scheduler, or other entity, triggers a wake-up of the waiting thread in response to the lock release operation 306. Once the waiting thread is woken up, the waiting thread checks that the lock is released and continues with its execution after acquiring the lock (308).

Figure 4:
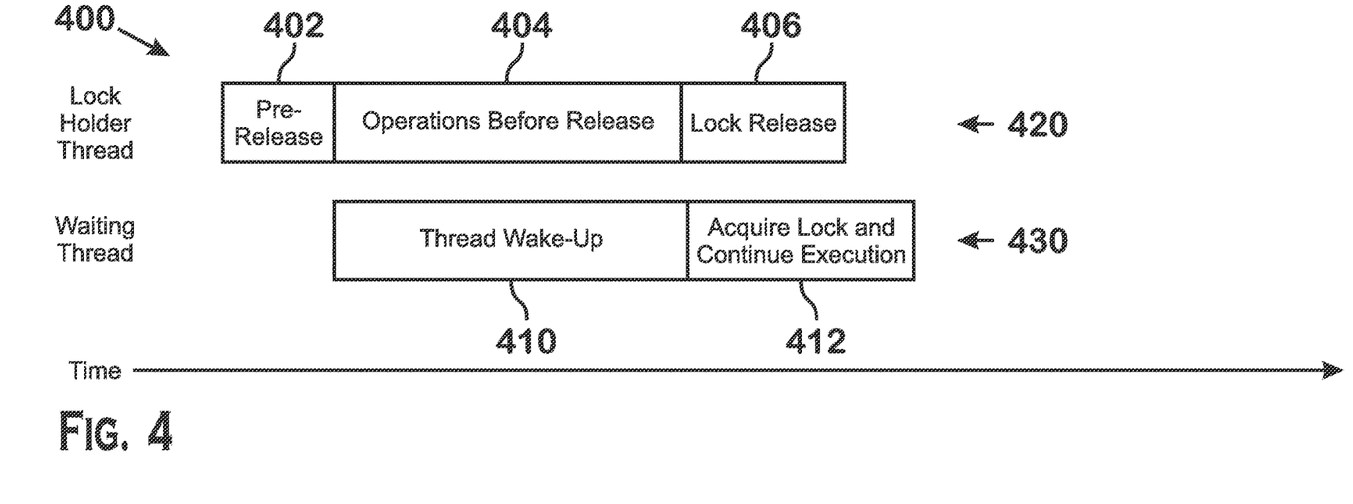
FIG. 4 presents a graph illustrating thread lock and wake-up operations, according to another example.

As can be seen, there is a certain amount of latency associated with waking up the waiting thread once the lock release occurs. This latency represents overhead associated with the lock release process. This latency is undesirable. FIG. 4 illustrates a technique in which a pre-release operation 402 reduces the latency between lock release and thread wake-up, according to an example.

FIG. 4 illustrates a graph 400 that shows operations of a lock holder thread and a waiting thread, with time progressing from left to right. The graph 400 begins with the lock holding thread holding a lock. The waiting thread is asleep and waiting for the lock to be released in order to continue. A lock holder thread graph 420 is illustrated, which shows operations of the lock holder thread in sequence, and a waiting thread graph 430 is illustrated, which shows operations of the waiting thread in sequence.

In the technique illustrated in FIG. 4, the lock holder thread performs a pre-release operation 402. The pre-release operation 402 occurs prior to the "true" lock release operation 406, and serves as a signal to the waiting thread that the lock will soon be released. A lock for which an early release operation 402 has been performed may be referred to herein as a lock that is "pre-released." In some implementations, the processor on which the lock holder thread is executing marks the lock as pre-released in response to executing the pre-release operation for that lock. That mark is cleared (i.e., the lock is indicated as no longer being pre-released) in certain situations, such as after one or more threads waiting on that lock have been woken up, and one of the woken up threads has acquired the lock, and begun proceeding with execution past the lock acquisition. In some implementations, the mark is also cleared if a waiting thread wakes up in response to detecting that the lock the waiting thread is waiting on has been pre-released but too much time passes after such wake up and before the lock is actually released. Additional details regarding clearing the pre-release mark are provided elsewhere herein.

In response to the early release operation 402, the waiting thread begins a thread wake-up operation 410. The lock holder thread continues past the early release operation 402, performing the operations before lock release 404, and, when complete with the operations before lock release 404, performing the lock release 406.

When the waiting thread wakes up, the waiting thread checks whether the lock has been released (i.e., whether the lock holder thread has completed the lock release operation 406). If the waiting thread determines that the lock has been released, then the waiting thread acquires the lock and continues its execution 412, performing whatever operations are specified by its software to be performed after the lock has been acquired. If the waiting thread determines that the lock has not yet been released, then the waiting thread continues waiting for the lock to be released.

Because the waiting thread begins the wake-up process earlier in the sequence of FIG. 4 as compared with the sequence of in FIG. 3, the overall latency experienced by the waiting thread is reduced or eliminated in the sequence of FIG. 4 as compared with the sequence of FIG. 3. More specifically, the thread wake-up operation occurs in a time period that at least partially overlaps with the time period in which the thread wake-up 410 for the waiting thread occurs, thus "hiding" the latency of the thread wake-up. Put another way, the waiting thread begins its wake-up earlier in FIG. 4 than in FIG. 3.

In various examples, the time at which the pre-release operation 402 is executed is algorithmically determined by a compiler at compile time based on the code for the lock holding thread, is automatically determined by hardware facilitating locks in the execution environment of the lock holder thread, or is explicitly specified by a programmer by inserting an explicit instruction or computer code statement into the code for the lock holding thread.

In some examples, the pre-release operation 402 and the lock release operation 406 are each instructions in an instruction set architecture of the processor on which the lock holder thread is running. In such a situation, a compiler that compiles software for execution on that processor would insert such instructions into the compiled program in response to detecting a lock release operation indicated in computer code. In other examples, any of the pre-release operation 402 or the lock release operation 408 may not be part of the instruction set architecture. In such example, the compiler does not insert a pre-release instruction into the compiled program. Instead, the compiler inserts "traditional" instructions for releasing a lock, where "traditional" means typical, well known instructions for releasing a lock. In response to detecting these traditional instructions, the processor performs the pre-release operation 402 at some time prior to performing the traditional instructions, which performs the lock release operation 406 of FIG. 4.

Although a number of components are illustrated in FIGS. 1 and 2, any of the components illustrated in FIGS. 1 and 2 may or may not be included. Some of the above components, such as the processor 102 and the APD 116, include examples of processing devices that are multithreaded, can have thread locks, and are thus able to implement the teachings provided herein. However, processing devices other than the ones explicitly mentioned herein would also be capable of implementing the teachings provided herein.

In the descriptions herein, an entity referred to as the "lock orchestrator" is described. This lock orchestrator is the entity other than the one or more threads involved in the lock release or exchange that controls the release of the lock, including noting when a lock is considered to have been pre-released, communicating such information to the waiting thread, and/or controlling the waiting thread according to that information (such as by initiating wake-up of that thread). The lock orchestrator is implemented in any technically feasible manner. In various examples, the lock orchestrator is a software component executing on one or more processors of the system on which the waiting and lock holding threads are executing, one or more software routines executed on behalf of the threads involved in the lock release or exchange, is a hardware component in communication with the one or more processors of the system on which the waiting and lock holding threads are executing, or is a combination of such hardware and software. In various examples, the lock orchestrator executes on the processor 102 (e.g., as part of the operating system 120), on one of the compute units 132, on the scheduler 136, or on another hardware unit not shown. In other examples, the lock orchestrator includes one or more circuits that are part of the processor on which the lock holding thread and waiting threads are running.

Figure 5:
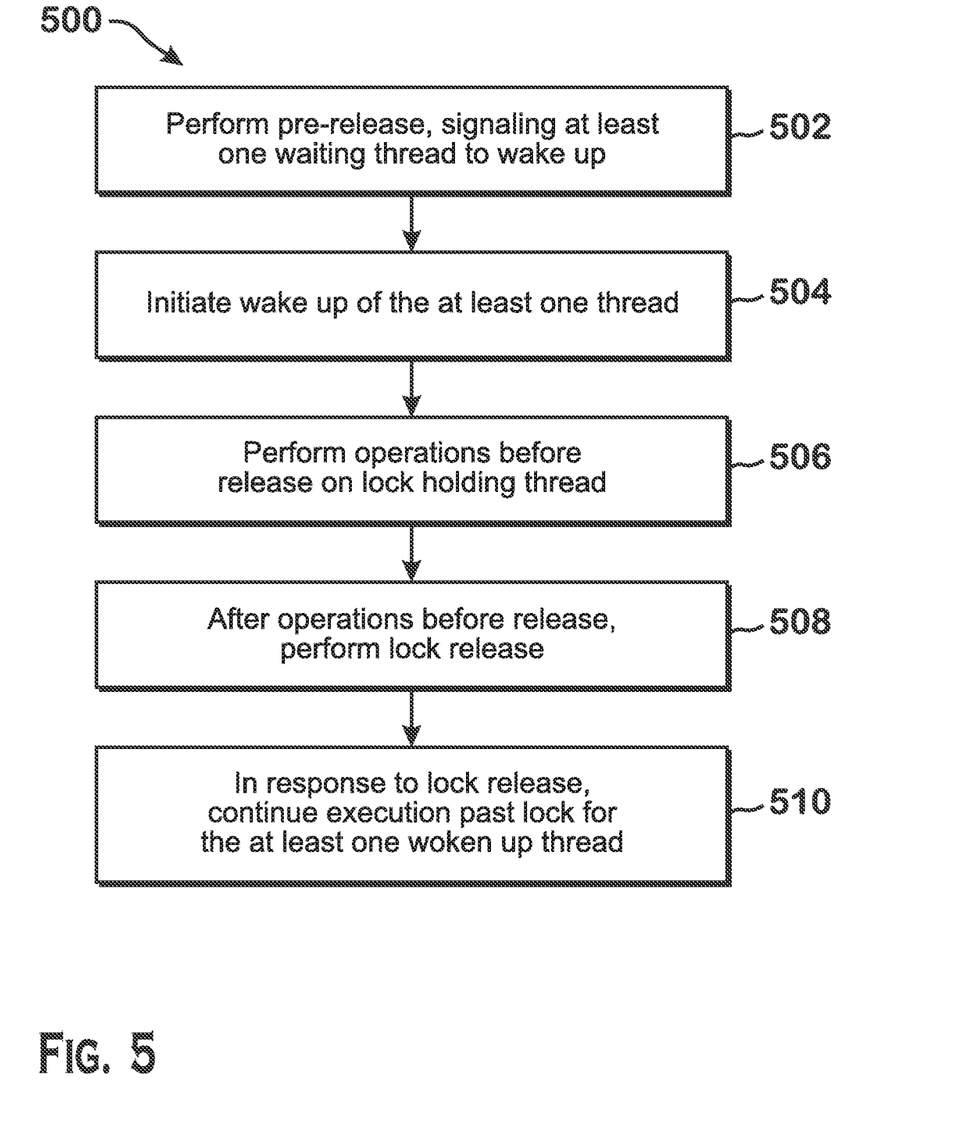
FIG. 5 is a flow diagram of a method for performing a lock release, according to an example.

FIG. 5 is a flow diagram of a method 500 for releasing a lock and waking up a thread, according to an example. Although described with respect to the system of FIGS. 1-4, it should be understood that any system capable of performing the method in any technically feasible order could alternatively perform the method 500.

The method 500 begins at step 502, where a lock holder thread performs a pre-release operation that signals at least one waiting thread to begin waking up. As described elsewhere herein, this pre-release operation acts as a signal to the waiting threads to begin waking up. At this point, according to some implementations, the lock is marked as pre-released. At step 504, one or more threads waiting on the lock are woken up in response to the pre-release operation. Waking up the one or more threads may be performed by a software entity or a hardware entity, such as an operating system or a hardware thread scheduler. In some examples, the lock orchestrator wakes up the thread. The waiting thread thus begins waking up—an operation that may consume a large amount of time, such as several microseconds. In some implementations, all threads waiting on the lock are woken up when the lock is pre-released. In some implementations, only one of multiple threads waiting on the lock is woken up upon pre-release of the lock. In such implementations, the thread to be woken up is selected based on priorities among waiting threads or other policies implemented by the entity orchestrating the lock exchange. If there are no threads waiting on the lock, the pre-release does not perform any operation other than marking the lock as pre-released, in implementations that use such marking.

At step 506, the lock holder thread performs the operations before lock release. These operations before lock release include the operations of the lock holder thread prior to the release operation 406 but after the pre-release operation 402. The operations before lock release are operations are programmed into the lock holder thread that occur between the pre-release operation 402 and the release operation 406. At step 508, the lock holder thread performs a release operation 406. The release operation 406 actually releases the lock, allowing one or more waiting threads, based on the semantics of the lock implementation, to continue their execution. Thus, at step 510, in response to the lock release operation, the waiting thread continues execution after the lock release.

In some situations, a waiting thread is configured to acquire the lock that the thread is waiting on in response to that lock being released. In such a situation, the waiting thread executes an instruction or sequence of instructions to begin waiting on the lock. If upon executing that instruction or sequence of instructions, the waiting thread detects that the lock is marked as pre-released (in other words, that the lock holding thread has already executed the pre-release operation 402), then the waiting thread does not get put to sleep but instead polls the lock (continuously loops and checks whether the lock is released). Thus the early release operation is useful in reducing latency in the instance that a thread is waiting to acquire a lock that is about to be released. Such latency would occur without use of the pre-release operation because the thread would be put to sleep and then would need to be woken up.

Figure 6:
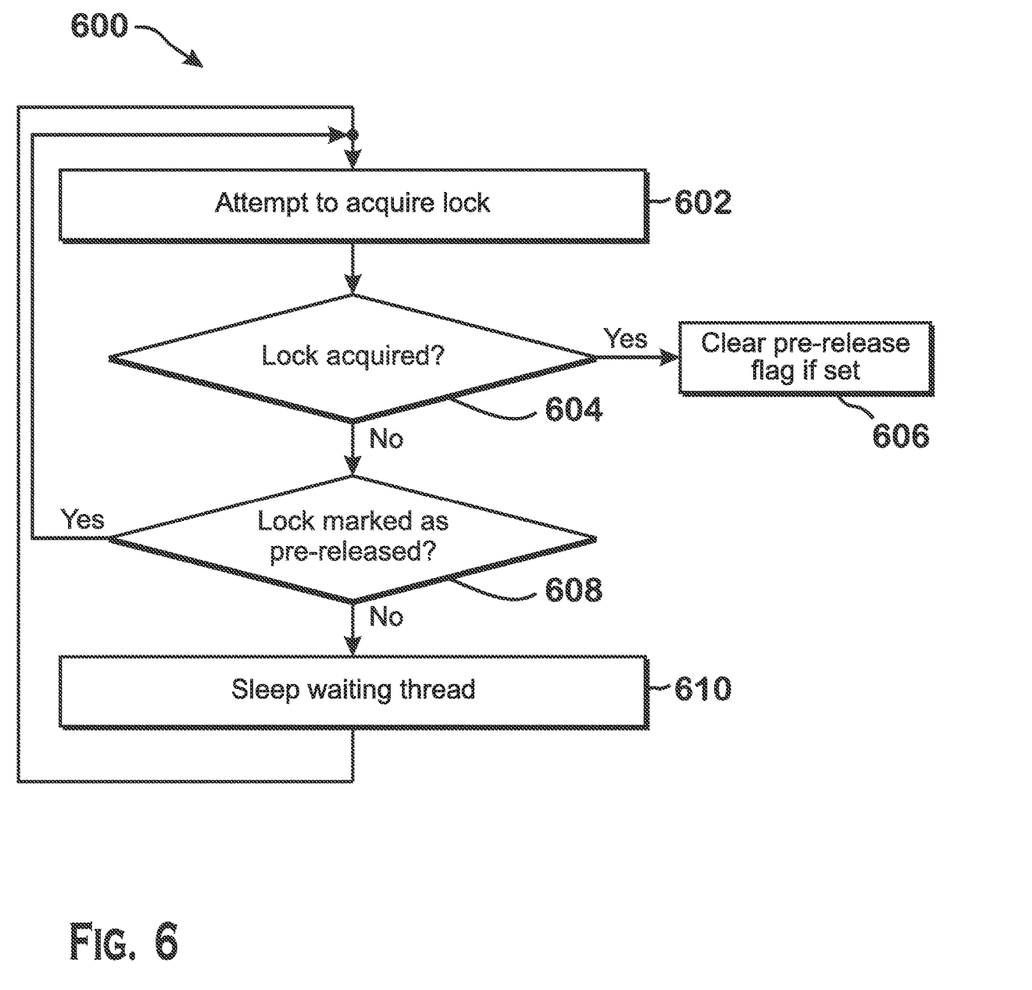
FIG. 6 is a flow diagram of a method for acquiring a lock, according to an example.

FIG. 6 is a flow diagram of a method 600 for waiting for a lock to be freed and acquiring that lock, according to an example. Although described with respect to the system of FIGS. 1-4, it should be understood that any system capable of performing the method in any technically feasible order could alternatively perform the method 600.

The method 600 begins at step 602, where a lock acquiring thread attempts to acquire the lock (the lock acquiring thread is similar to the waiting thread described elsewhere herein except that the lock acquiring thread does not necessarily wait on the lock if that thread is able to acquire the lock due to the lock already having been released). Attempting to acquire the lock may be performed according to any technically feasible mechanism. In one example, the lock acquiring thread attempts to acquire the lock by performing an atomic read-modify-write operation that atomically checks the lock variable for a value indicating that the lock is free. If the value indicates that the lock is free, then the read-modify-write operation writes a value indicating that the lock is not free, thereby acquiring the lock for the lock acquiring thread. If the value indicates that the lock is not free, then no modification occurs, and thus the lock acquiring thread is unable to acquire the lock.

At step 604, the lock acquiring thread (or the lock orchestrator) determines whether the lock is acquired by the lock acquiring thread (i.e., whether step 602 is successful due to the lock holding thread having released the lock). If the lock is acquired by the lock acquiring thread, then the method 600 proceeds to step 606, where the lock acquiring thread or lock orchestrator clears the pre-release flag if that flag is set. As described above, the pre-release flag is a flag indicating whether the lock was the subject of a pre-release operation 402 by a (different) lock holding thread. This flag is considered "set" if the lock was the subject of a pre-release operation 402 (i.e., if the lock holder thread has executed the pre-release operation 402) and the flag is considered not set if the lock was not yet the subject of a pre-release operation 402 (i.e., if the lock holder thread has not yet executed the pre-release operation 402). The flag is cleared by the lock acquiring thread if the lock acquiring thread acquires the lock because acquiring the lock represents a new instance of holding that lock. The lock acquiring thread, which is now a lock holding thread, is able to execute the pre-release operation 402 in the future to again set the pre-release flag for that lock. However, at the time the lock acquiring thread acquires the lock, the lock is not considered to be pre-released anymore. It is of course possible for the pre-release flag to not have been set for the lock, such as if the thread that previously held the lock never executed a pre-release operation. In this case, there is no need to clear that flag.

Returning to step 604, if the lock is not acquired at step 604, then the method 600 proceeds to step 608. At step 608, the lock orchestrator or lock acquiring thread determines whether the lock is marked as being pre-released (i.e., whether the lock holder thread has executed the pre-release operation 402). If the lock has not been marked as pre-released, then the method proceeds to step 610, where the lock acquiring thread is put to sleep. After the thread wakes up (e.g., as a result of a future lock pre-release operation or lock release operation by a lock holding thread), the method 600 returns to step 602 for the lock acquiring thread.

If, at step 608, the lock has been marked as pre-released, then the method 600 returns to step 602, however, without sleeping the lock acquiring thread. Step 608 is a check regarding whether the lock is "soon" to be released, as signaled by the lock holding thread. If the lock is soon to be released, due to being marked as pre-released, then the lock acquiring thread should not be put to sleep and instead polls the lock. If the lock has not yet been marked as pre-released at step 608, then the lock acquiring thread is put to sleep so that the processing resources that would otherwise be used for polling may be used for other operations. In this scenario, polling is deemed to be too inefficient.

In one modification to the method 600 of FIG. 6, instead of immediately putting the lock acquiring thread to sleep if the lock is not marked as pre-released, the lock acquiring thread polls the lock for a certain amount of time and then, if the lock has still not been marked as pre-released, goes to sleep.

Note, FIG. 6 also describes steps that are possible once the lock acquiring thread has been woken up at step 504 of FIG. 5—specifically, FIG. 6 describes the steps performed by the waiting thread between steps 504 and 510 of FIG. 5. In an optional modification, step 602 does not require an attempt to acquire the lock but only a check for whether the lock is available, and step 604 would not be a determination of whether the lock is acquired but instead whether the lock is available.

Note, for either the method of FIG. 5 or the method of FIG. 6 (i.e., either the scenario where the waiting thread is woken up by the pre-release operation or the scenario where the waiting thread is waiting to acquire the lock held by the lock holding thread), it is possible for a large amount of time to exist between the time the lock is marked as pre-released and the time the lock is actually released by the lock release operation. In an example, such a scenario occurs when the lock holding thread is pre-empted by the OS scheduler after the lock holding thread has performed the pre-release operation 402 but before the lock has performed the release operation 406. If the lock holding thread is not rescheduled again for a long time, this results in the waiting thread polling the lock for a long time, which is inefficient.

Several options are available to help with this inefficiency. In one option, the lock orchestrator turns off OS preemption after the lock holding thread performs the pre-release operation until the time the lock holding thread performs the release operation. Thus, the OS would not be able to preempt the lock holding thread during this time period. In conjunction, the lock holding thread may ensure (e.g., via the compiler during code generation) that the lock holding thread does not execute operations that can trigger long latencies such as I/O operations between the pre-release and release of a lock. In another option, each thread that polls a pre-released lock implements a timer that indicates the amount of time that thread will poll the pre-released lock before going to sleep. If the lock is not actually released (via a release operation executed by the lock holding thread) before the timer expires, then the waiting thread goes to sleep. When the waiting thread wakes up again, the same thing occurs—the thread polls the lock until the timer expires or the lock is released via the release operation. In another option, each thread implements a timer that indicates the amount of time that thread will poll the pre-released lock before going to sleep, but if the timer expires, the thread clears the pre-release flag, making it appear to all threads as if the lock is no longer pre-released. This option can be viewed as a "verification" or "correction" to the pre-release indication made by the lock holder in situations in which the lock takes too long to be released after the pre-release operation is performed.

In the description above, the waiting thread and the lock holder thread may be executed on different processing units. Any of the processing units of FIG. 1, such as the processor 102, a core of the processor 102, or of FIG. 2, such as a compute unit 132, a SIMD unit 138, or another processor, could execute either of the lock holder thread or the waiting thread.

Although described above in the context of locks, it is possible to use the techniques described herein for other mutual exclusion or synchronization primitives such as semaphores. Operations for acquiring and releasing a lock would be replaced with operations for acquiring and releasing another synchronization primitive. A pre-release operation for that synchronization primitive would be used as well, to indicate that the synchronization primitive is about to be released.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for releasing a thread synchronization lock and waking up a waiting thread, the method comprising:
   while the thread synchronization lock is not yet released, performing a first pre-release operation by a lock holder thread that holds the thread synchronization lock to notify the waiting thread that the thread synchronization lock is pending release;
   responsive to the first pre-release operation, initiating wake-up of the waiting thread;
   performing one or more operations before release of the thread synchronization lock, by the lock holder thread in a first time period that at least partially overlaps with a second time period during which the waiting thread wakes up;
   responsive to the one or more operations before lock release ending, performing a lock release operation by the lock holder thread to release the thread synchronization lock; and
   responsive to the lock release operation, continuing execution of the waiting thread past the lock.

2. The method of claim 1, wherein the first pre-release operation is performed in response to executing a pre-release instruction that is part of an instruction set architecture of a processor on which the lock holder thread is executing.

3. The method of claim 1, further comprising:
   switching off operating system thread pre-emption from the time that the first pre-release operation is performed until the time that the lock release operation is performed.

4. The method of claim 1, wherein:
   after the waiting thread wakes up, the waiting thread checks the lock, determines that the lock release operation has occurred and continues execution upon determining that the lock release operation has occurred.

5. The method of claim 4, wherein checking the lock comprises:
   determining that the lock is not available but that the lock is marked as pre-released; and
   responsive to the determining, polling the lock.

6. The method of claim 5, further comprising:
   performing the polling until a timeout has occurred; and
   responsive to the timeout occurring, putting the waiting thread to sleep.

7. The method of claim 6, further comprising:
   responsive to the timeout occurring, marking the lock as not pre-released.

8. The method of claim 1, further comprising:
   after waking up the waiting thread, attempting to acquire the lock by the waiting thread; and
   upon not being able to acquire the lock but determining that the pre-release operation has been performed for the lock, polling the lock by the waiting thread, instead of putting the waiting thread to sleep.

9. The method of claim 8, further comprising:
   after a timeout has occurred during which the thread synchronization lock is polled, putting the waiting thread to sleep.

10. A system for releasing a thread synchronization lock and waking up a waiting thread, the system comprising:
    a first device configured to execute a lock holder thread that holds the thread synchronization lock; and
    a second device configured to execute a waiting thread, the second device being either the first device or a device that is not the first device,
    wherein the lock holder thread is configured to:
      while the thread synchronization lock is not yet released, perform a first pre-release operation to notify the waiting thread that the thread synchronization lock is pending release,
      perform one or more operations before release of the thread synchronization lock, by the lock holder thread in a first time period that at least partially overlaps with a second time period, and responsive to the one or more operations before lock release ending, perform a lock release operation to release the thread synchronization lock;
    wherein the waiting thread is configured to:
      responsive to the pre-release operation, initiate wake-up of the waiting thread during the second time period, and
      responsive to the lock release operation, continue execution of the waiting thread past the lock.

11. The system of claim 10, wherein the pre-release operation is performed in response to executing a pre-release instruction that is part of an instruction set architecture of the first device.

12. The system of claim 10, wherein an operating system is configured to switch off operating system thread pre-emption from the time that the first pre-release operation is performed-.

13. The system of claim 10, wherein after the waiting thread wakes up, the waiting thread is further configured to:
    check the lock and determine that the lock release operation has occurred and continue execution upon determining that the lock release operation has occurred.

14. The system of claim 13, wherein the waiting thread is configured to check the lock by:
    determining that the lock is not available but that the lock is marked as pre-released; and
    responsive to the determining, polling the lock.

15. The system of claim 14, wherein the waiting thread is further configured to:
    perform the polling until a timeout has occurred; and
    responsive to the timeout occurring, putting the waiting thread to sleep.

16. The system of claim 15, wherein the waiting thread is further configured to, responsive to the timeout occurring, mark the lock as not pre-released.

17. The system of claim 10, wherein:
    the waiting thread is configured to, after waking up, attempt to acquire the thread synchronization lock; and upon not being able to acquire the lock but determining that the pre-release operation has been performed for the lock, poll the lock instead of putting the waiting thread to sleep.

18. The system of claim 10, wherein the waiting thread is further configured to, after a timeout has occurred during which the thread synchronization lock is polled, put the waiting thread to sleep.

19. A non-transitory computer-readable medium storing instructions for releasing a thread synchronization lock and waking up a waiting thread, that when executed by a processor, cause the processor to:

while the thread synchronization lock is not yet released, perform a first pre-release operation by a lock holder thread that holds the thread synchronization lock to notify the waiting thread that the thread synchronization lock is pending release;

responsive to the first pre-release operation, initiate wake-up of the waiting thread;

perform one or more operations before release of the thread synchronization lock, by the lock holder thread in a first time period that at least partially overlaps with a second time period during which the waiting thread wakes up;

responsive to the one or more operations before lock release ending, perform a lock release operation by the lock holder thread to release the thread synchronization lock; and responsive to the lock release operation, continue execution of the waiting thread past the lock.

20. The non-transitory computer-readable medium of claim 19, wherein the first pre-release operation is performed in response to executing a pre-release instruction that is part of an instruction set architecture of a processor on which the lock holder thread is executing.

* * * * *